United States Patent [19]

Snetsinger et al.

[11] Patent Number: 4,516,531

[45] Date of Patent: May 14, 1985

[54] FEED INTAKE CONTROL APPARATUS FOR ANIMALS

[75] Inventors: David C. Snetsinger, Webster Groves; Henry M. Engster, St. Louis; Dwaine D. Stiebler, Washington, all of Mo.

[73] Assignee: Ralston Purina Company, St. Louis, Mo.

[21] Appl. No.: 591,721

[22] Filed: Mar. 21, 1984

[51] Int. Cl.³ ...................... A01K 31/00; A01K 39/00
[52] U.S. Cl. .......................................... 119/18; 119/63
[58] Field of Search ....................... 119/17, 18, 22, 59, 119/63, 51.12

[56] References Cited

U.S. PATENT DOCUMENTS

| | | | |
|---|---|---|---|
| 3,180,316 | 4/1965 | Chatfield et al. | 119/51.12 |
| 3,333,573 | 8/1967 | Wotring | 119/51 R |
| 3,498,267 | 3/1970 | Leeming | 119/18 X |
| 3,916,837 | 11/1975 | Murto | 119/18 |
| 4,059,071 | 11/1977 | Van Huis et al. | 119/18 |
| 4,418,628 | 12/1983 | Cahill | 109/19 |
| 4,457,263 | 7/1984 | Cassou | 119/18 X |

*Primary Examiner*—Robert P. Swiatek
*Attorney, Agent, or Firm*—Virgil B. Hill

[57] ABSTRACT

A feed intake control apparatus for caged animals is disclosed which comprises a movable belt adapted to cover a standard feeding device such as a feed trough adjacent to a cage wherein a portion of the belt contains an opening to provide both an opened and closed position for the belt over the feeding device. A control device for the belt is also provided for preselected movement of the belt to either an opened or closed position to permit the animal access to a feeding device when the belt is in an opened position and denying the animal access when the belt is in a closed position. The feed intake control apparatus of the present invention is readily adaptable to existing cage and trough type feeding systems without elaborate or extensive modification.

18 Claims, 5 Drawing Figures

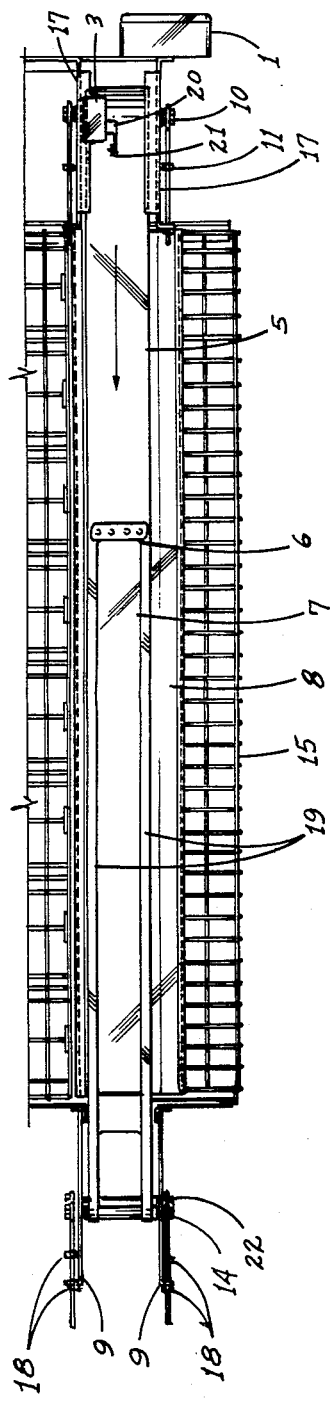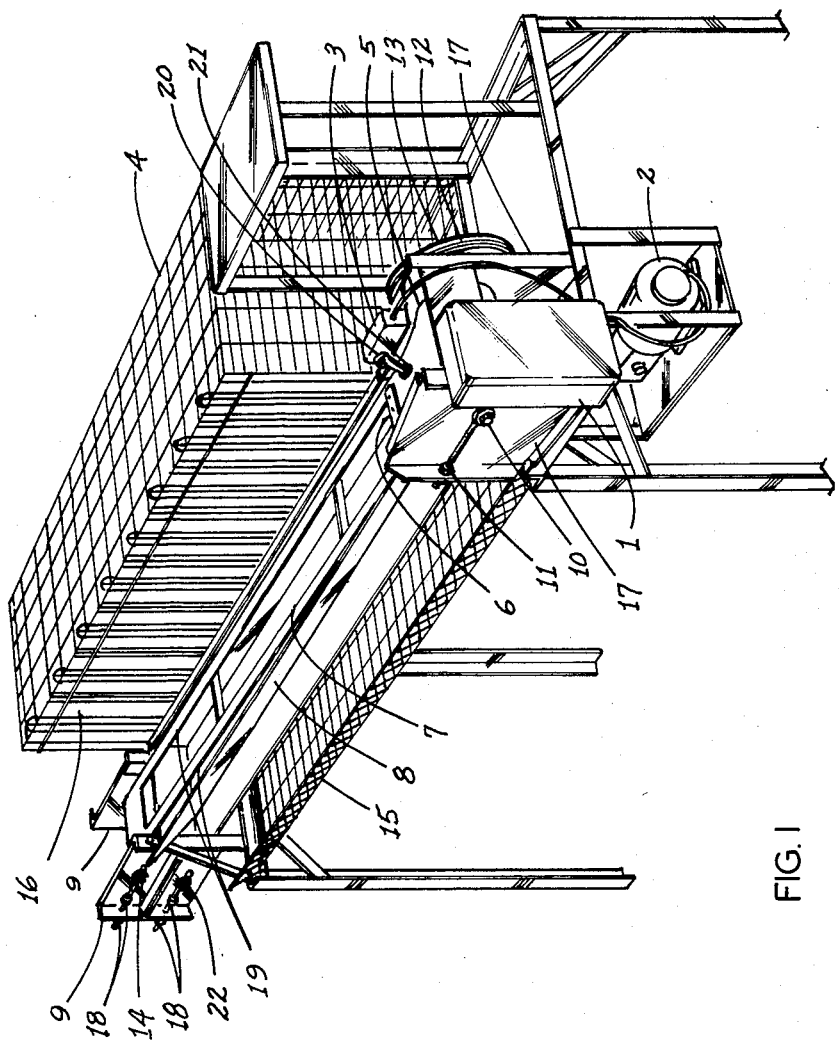

FEED INTAKE CONTROL APPARATUS FOR ANIMALS

BACKGROUND OF THE INVENTION

This invention relates to an apparatus and a method for controlling the feed intake of animals, particularly poultry.

It is becoming increasingly important in animal feeding operations that the feed supply for the animals be controlled. Typically, in operations involving poultry, the poultry are confined in cages in a controlled environment and the cages are stacked together to form a row of cages of varying height and density. A trough type feeder is usually adjacent to the cage with an opening in the cage to permit access to the feeder by the poultry. The poultry, with unlimited access to the feed supplement in the trough, however, will tend to consume more feed than is needed for growth or egg production. This accordingly results in a reduction in feed efficiency and is of critical importance to the overall economic success of a large poultry feeding operation. Therefore, a means to eliminate a reduction in feed efficiency by over consumption of the feed supplement by the poultry is very much needed.

Several different types of devices have been proposed to control feed consumption by caged animals such as poultry. U.S. Pat. No. 3,916,837 for example describes a trough feeder for poultry having a movable shield to prevent access by the poultry when the feed is being deposited in the feed trough by an automatic feeder. A time clock and feed level sensor with the automatic feeder is included to open and close the feeder trough shield when preset times and feed levels are reached. U.S. Pat. No. 4,059,071 describes another type of a feed trough in which a movable top cover is placed over the feed trough to prevent access by the poultry. Control and cable means is provided for displacement of the cover to provide access to the feed supplement at predetermined intervals.

Both of these devices provide a means of controlling the feed intake of animals by controlling access to the feed, however, the equipment contained in both of these situations require the use of feed troughs which have been significantly modified in order to prevent access by the animal. These special feed troughs require significant expenditure of money or extensive cage modifications thereby significantly increasing the cost of a poultry operation. It would therefore be highly beneficial if equipment could be found to regulate the feed intake of animals which avoids the need for complicated and special equipment and which could be adapted to existing cage systems as well as feed troughs in general with only minor modifications. This would permit ready adaptation to existing poultry operations without extensive equipment purchases to replace existing cages; feed troughs and the like.

Accordingly, it is an object of the present invention to provide an apparatus which is highly useful in controlling feed intake for animals, particularly for caged animals.

It is also an object of the present invention to provide a controlled feeding apparatus that is adaptable to an existing cage system such as for example for the feeding of poultry or swine.

It is another object of the present invention to provide a method and apparatus for regulating the feed intake of animals such as poultry for purposes of controlling feed consumption by the poultry to predetermined levels for maximum feed efficiency and egg production.

These and other objects and advantages of the present invention will become apparent upon reading the following detailed description and drawings.

BRIEF DESCRIPTION OF THE DRAWINGS

FIG. 1 shows an overall view of the feed intake control apparatus of the present invention adapted to a feeding trough on a series of cages.

FIG. 2 shows a top view of the feed intake control apparatus adapted to a feeding trough adjacent to a series of cages showing the belt in a partially open position.

SUMMARY OF THE INVENTION

Figure 4:
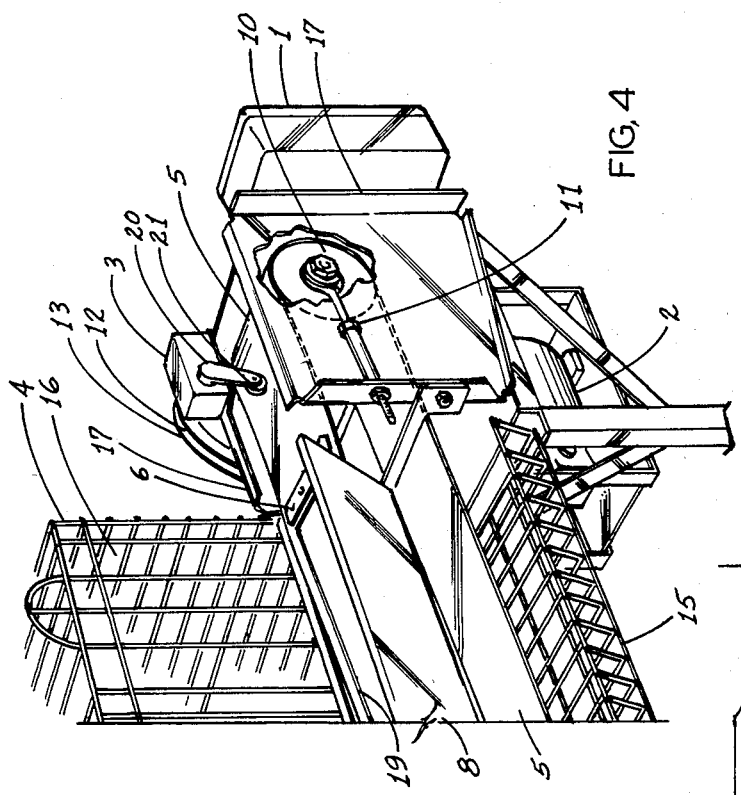
FIG. 4 shows in detail the control means for the feed intake control apparatus of the present invention.

The present invention relates to an apparatus for controlling the feed intake of animals, particularly poultry or swine, which are raised or fed in a cage system. The feed intake control apparatus of the present invention comprises a movable belt that is adapted to cover a feeding means such as a trough which is typically adjacent to a cage or a series of cages in a large animal feeding operation such as is involved in the feeding of poultry. The movable belt adapted to cover the trough has a portion with an opening so that when the portion of the belt without the opening covers the feeding means or trough, it represents a closed position for the belt over the feeding means thereby preventing access by the animal to the feed contained in the trough. Similarly, when the opening in the belt is moved over the feeding trough, it represents an open position for the belt over the trough thereby permitting the animal to have access to the feed contained in the trough. The movable belt is operated by a control means which provides for preselected movement of the belt to either an open or closed position thereby controlling access of the animal to the feed on a predetermined basis.

The feed intake control apparatus of the present invention is unique by both its simplicity and efficiency in operation. Previous devices for controlling access to the feed by an animal have involved the use of very complex types of equipment. Those devices that have been used to cover feed troughs and removed by a timer or electronic control means have been especially complicated employing a complex mechanical system with pullies, cables, and the like for removal of the trough covers. The use of this type of equipment not only represents a possible maintenance problem insofar as usage in the dusty environment of a poultry house but also represents an economic problem in that complete replacement of existing equipment is usually involved.

By contrast, the feed intake control apparatus of the present invention is readily adaptable to an existing or standard system of cages and troughs by simple placement of the movable belt over the feeding troughs and the attachment of a control means for purposes of controlling indexing of the belt over the trough to permit or deny access of the animal to the feed. The drive means employed in the apparatus of the present invention is further improved by placement of the movable belt on suitable roller means so that the belt may be used in a very large scale feeding operation on a continuous basis. Typically, the movable belt which comprises an endless belt, is mounted on both a fixed and free play roller means to control movement of the belt by connection of the fixed roller means to a drive means. Furthermore, the use of a free play roller for mounting of the belt provides a means for adjustment of the tension of the belt. The feed intake control apparatus of the present invention is highly efficient and simple in design and is readily adaptable to an existing poultry operation without significant alteration of the existing cage system or attached feeding means.

DETAILED DESCRIPTION OF THE PREFERRED EMBODIMENTS

While the present invention is described below with reference to a preferred embodiment and procedure for the feeding of caged animals such as poultry and swine, it will be understood that it is not intended to limit the present invention to the embodiment or procedure hereinafter described. On the contrary, it is intended to include all reasonable alternatives, modifications, and equivalents as may be included with the spirit and the scope of the present invention.

With reference to FIGS. 1 through 5, there is shown a cage 4 such as is found in modern poultry houses. These cages are defined by wire bars and usually are stacked in tiered fashion by addition of a suitable supporting structure. The cage may contain 2 to 10 adult hens in each cage. These cages have a floor consisting of wire bars on which the hens stand. The wire floor will have a sloping surface tilted slightly towards the front of the cage to permit eggs laid by the hens on the floor to roll forward through an opening at the bottom front portion of the cage into a collection tray 15. This permits easy collection and removal of the eggs without damage by the poultry. The cage has at least one opening 16 to permit the hens to feed therethrough.

A feeding means 8 such as a feed trough and the like is adjacent to said opening and is preferably attached to the front of the cage. This feeding means preferably comprises an open trough with closed ends and an opening on the top to allow the poultry to reach the feed supplement contained in the trough. The opening 16 at the front upper portion of the cage provides easy access by the animal to the feeding means 8 containing the feed supplement. It is not critical to the practice of the present invention what specific type of feeding means be employed, and a standard trough as is typically found on cages is quite suitable although it is preferred that feeding means which have automatic refilling mechanisms for the feed be employed to insure a constant supply of feed in the trough for the animal.

The feed intake control apparatus of the present invention is generally illustrated by FIGS. 1 and 2 and comprises a movable belt 5 which typically is an endless belt and is mounted as an endless loop around at least one fixed drive roller 10 and at least one adjustable roller. The composition of the belt is not critical to the practice of the present invention although it should be somewhat flexible as well as durable. Accordingly, a plastic or fabric belt such as Mylar ® or nylon are preferred. Mounting of the movable belt 5 on the rollers also includes a support means 11 for the fixed driver roller 10 which in turn is anchored or connected to housing 17 which generally serves to house the drive roller 10 and control means for the intake control apparatus of the present invention. The adjustable roller shown in FIGS. 1, 2 and 5 comprises an upper adjustable roller 14 and a lower adjustable roller 22, which are slidably mounted in a bracket 9 which contains a number of adjustable bolts 18, the number of which depend on the number of rollers to slide each roller in a horizontal plane and thereby provide a belt tension adjustment means. This is specifically illustrated in FIG. 5 in which the bracket 9 and adjustable bolts 18 for both rollers are shown and this readily provides a convenient and easy means for the operator to periodically adjust the tension of the belt as may be required during operation of the apparatus. The number of rollers employed for mounting of the belt 5 is not critical to the practice of the present invention and the number used depends on the length and size of the belt, since it is apparent that it may be necessary to include various support rollers for a very long belt which have nothing to do with driving or tension adjustment of the belt. It is therefore intended to include any and all such variations within the scope of the present invention.

The movable belt 5 covers the feeding means 8 thereby providing a movable cover for the feeding means. The movable belt 5 also contains an opening 7, which can be of any shape or length desired depending on the size of the feeding means or belt although preferably it is of rectangular shape and is cut into the movable belt 5 in such a fashion that when the belt is in an open position, the opening 7 substantially opens the feeding means 8 to access by animals contained in cage 4. Furthermore, the opening is cut into movable belt 5 in such a fashion that the outer edge portions 19 of the belt are retained for operation of the belt on the rollers. The belt opening 7 when indexed over the feeding means 8 provides an opened position for the belt 5 over the feeding means which permits an animal in cage 4 to access feed in the feeding means 8 through cage opening 16. By the same token, when the portion of belt 5 which does not contain an opening covers the feeding means 8, this provides a closed position for the belt 5 which prevents access by the animal to feed contained in the feeding means 8. The use of at least one roller 10 and 14 at opposite ends of the feeding means represents a preferred but non-limiting embodiment of the present invention and permits the movable belt 5 to be mounted as an endless loop over and under the feeding means. This permits the feed intake control apparatus of the present invention to be readily adaptable and useable on existing cage systems having feeding troughs without significant modification to either the cages or feeding troughs themselves.

Figure 3:
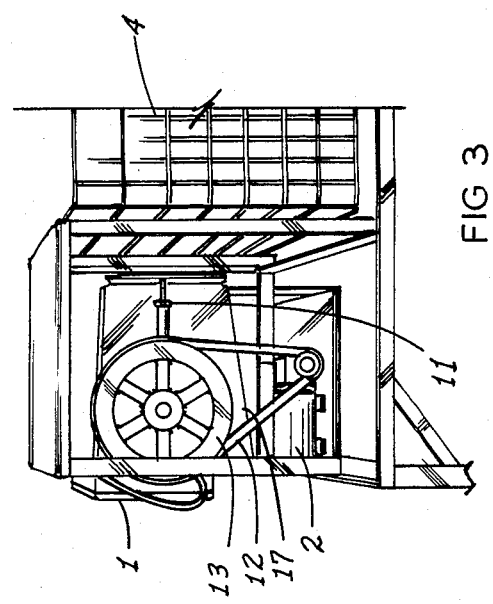
FIG. 3 shows in detail the drive means for the feed intake control apparatus of the present invention.
Figure 5:
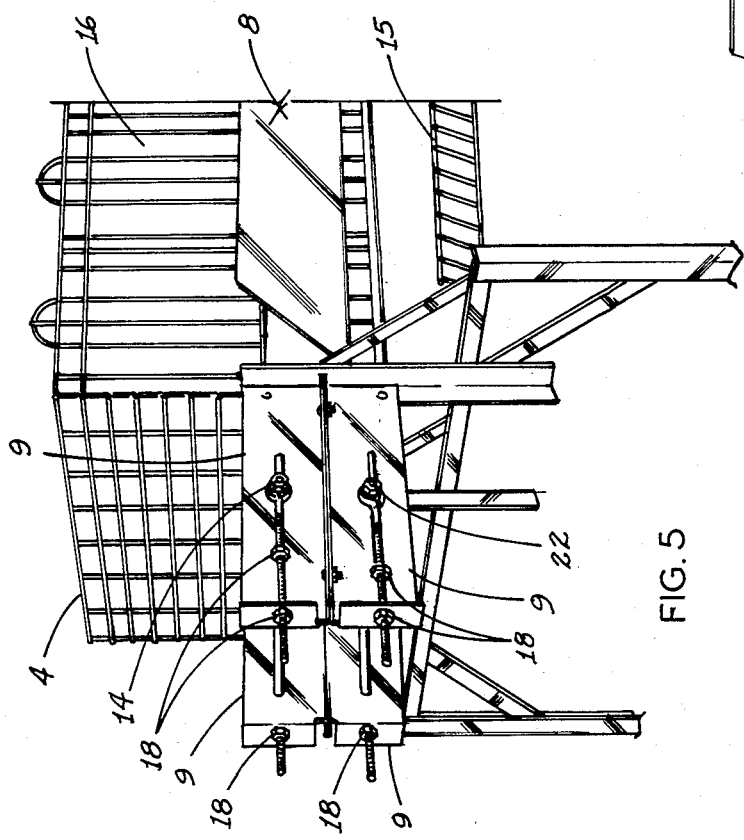
FIG. 5 shows in detail the belt tension adjustment means for the belt used in the feed intake control apparatus.

A control means is generally provided in the present invention by the combination of a timer 1, a drive motor 2, and a switch 3 wherein the drive motor 2 is connected to at least one drive roller 10 by virtue of a pulley 12 and a drive wheel 13 thereby providing a drive means for the movable belt 5 in an endless loop fashion around the feeding means 8. FIG. 3 further illustrates in more detail the drive means for the movable belt 5 and the exact drive means used is not intended to be critical in the construction of the apparatus of the present invention. It is however, preferred that the drive motor 2 comprise a gear reduction motor to provide for slow steady movement of the belt 5 when the belt is activated to move to either an opened or closed position. This permits easy yet rapid movement of the belt without otherwise injuring or frightening animals contained in the cages during movement of the belt to either an opened or closed position.

The drive means for the feed intake control apparatus of the present invention further comprises a drive pulley 12 and drive wheel 13 which is mounted on at least one fixed drive roller 10 for movement of the belt 5. The driver roller 10 is further connected by support means 11 to housing 17.

An important element of the control means of the feed intake control apparatus of the present invention is a switch 3 which is shown and illustrated in more detail in FIG. 4. The switch 3 contacts the surface of the movable belt 5. Switch 3 is preferably a pressure activated two-way switch which can be used to inactivate the drive means. In this regard, timer 1 is connected to the motor 2 for operation of the drive means and typically timer 1 operates on a 24 hour basis to control operation of the movable belt 5. The operator can set the timer 1 for predetermined periods to provide for preselected movement of the belt 5 to either an open or closed position over the feeding means 8 in order to permit or deny access by the animal to feed contained therein. The period during which the belt is in either an opened or closed position can be expanded or reduced as desired by the operator to control feed intake by the animal. A typical modern poultry operation for example, has a controlled environment with controlled periods of light and darkness and typically during the period of time, the lights are on, the belt 5 can be in an open position, thereby permitting the poultry to have access to the feed.

In the operation of the apparatus of the present invention, timer 1 which is set for preselected activation, activates the motor 2, which in turn provides a drive means for movement of belt 5 from a closed to an open position. As is shown in FIGS. 1, 2 and 4, switch 3 has an arm 20 and a roller 21 which specifically contacts the surface of the belt 5. As the movable belt 5 moves in a counter clockwise direction when the belt is mounted in an endless loop over the rollers, the belt opening 7 provides an opened position for the belt on the feeding means 8. The belt opening 7 can also preferably be provided with a metal or a plastic strip 6 covering the width of the belt thereby providing a support means 45 degree of rigidity for the belt at both points on the belt where belt opening 7 begins or ends. As belt 5 is moving to an opened position, the switch roller 21 of switch 3 no longer makes contact with belt 5 when the opening 7 reaches the switch roller 21. The absence of pressure from the belt causes the switch arm 20 to move downward to an off position thereby inactivating the drive means and stopping movement of the belt 5 at exactly the point that belt 5 is in a substantially opened position over the feeding means 8. By the same token, as the timer 1, which is set for preselected activation, activates the drive means to move the belt 5 to a closed position over the feeding means 8, the closed portion of the belt will move toward the switch 3. The switch roller 21 will again come in contact with the surface of the belt 5 to cause an upward pressure on switch arm 21 thereby moving switch 3 upwards to a second "off" position. This causes the belt to be inactivated in a closed position over the feeding means thereby denying animals contained in cages 4 access to feed contained in the feeding means.

It is readily apparent from an examination of the feed intake control apparatus of the present invention that it is a unique and simple device for adaptation to a cage system for the raising of caged animals. It does not require the use of mechanically complex troughs and/or cages to achieve a high degree of success in controlling the intake of feed by the animals. The present invention provides a unique and beneficial means for controlling the feed intake by animals and is operated in such a way that feed efficiency and/or egg production of animals such as poultry may be readily controlled.

What is claimed is:

1. A caged system having feed intake control apparatus comprising:
   (a) at least one cage with an opening therein to permit an animal within the cage to feed through said opening;
   (b) feeding means adjacent to said opening;
   (c) a movable belt covering said feeding means, wherein a portion of said belt contains an opening to provide both an opened and closed position for said belt over said feeding means;
   (d) control means to provide for preselected movement of said belt to an opened position to permit the animal access to said feeding means and preselected movement to a closed position thereby denying the animal access to said feeding means.

2. The system of claim 1 wherein said movable belt comprises an endless belt.

3. The system of claim 1 wherein said feeding means comprises a trough.

4. The system of claim 1 wherein said movable belt is mounted on at least one free play roller means wherein said free play roller means includes a belt tension adjustment means.

5. The system of claim 1 wherein said control means comprises a timer activated drive means and a switch contacting the surface of said belt which inactivates the drive means.

6. The system of claim 5 wherein said switch is a pressure activated switch.

7. The apparatus of claim 6 wherein said switch has an arm with a roller contacting said belt.

8. The system of claim 5 wherein said timer operated drive means includes a timer, drive roller, and a motor.

9. The system of claim 8 wherein said motor is a gear reduction motor.

10. A feed intake control apparatus comprising:
    (a) a movable belt adapted to cover a feeding means, wherein a portion of said belt contains an opening to provide both an opened and closed position for said belt over a feeding means;
    (b) control means to provide for preselected movement of said belt to an opened position to permit the animal access to a feeding means and preselected movement to a closed position thereby denying the animal access to said feeding means.

11. The apparatus of claim 10 wherein said movable belt comprises an endless belt.

12. The apparatus of claim 10 wherein said movable belt is mounted on at least one free play roller means wherein said free play roller means includes belt tension adjustment means.

13. The apparatus of claim 10 wherein said control means comprises a timer activated drive means and a switch containing the surface of said belt which inactivates the drive means.

14. The apparatus of claim 13 wherein said switch is a pressure activated switch.

15. The apparatus of claim 14 wherein said switch has an arm with a roller contacting said belt.

16. The apparatus of claim 13 wherein said timer activated drive means includes a timer, drive roller and a motor.

17. The apparatus of claim 16 wherein said motor is a gear reduction motor.

18. The apparatus of claim 10 wherein said belt opening has a support means to provide rigidity at both ends of said opening.

* * * * *